(12) United States Patent
Murakami et al.

(10) Patent No.: US 8,970,077 B2
(45) Date of Patent: Mar. 3, 2015

(54) ROTARY ELECTRIC MACHINE

(75) Inventors: Tadashi Murakami, Chiyoda-ku (JP);
Kouichi Ojima, Chiyoda-ku (JP);
Masaya Inoue, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 173 days.

(21) Appl. No.: 13/452,398

(22) Filed: Apr. 20, 2012

(65) Prior Publication Data

US 2013/0093273 A1 Apr. 18, 2013

(30) Foreign Application Priority Data

Oct. 17, 2011 (JP) ................... 2011-227774

(51) Int. Cl.
*H02K 9/22* (2006.01)
*H02K 1/18* (2006.01)
*H02K 1/14* (2006.01)

(52) U.S. Cl.
CPC .................. *H02K 1/185* (2013.01); *H02K 9/22* (2013.01); *H02K 1/148* (2013.01); *H02K 2201/03* (2013.01)
USPC ..................... 310/64; 310/52; 310/54; 310/58

(58) Field of Classification Search
USPC ..................... 310/58–59, 64, 52, 54
See application file for complete search history.

(56) References Cited

U.S. PATENT DOCUMENTS

| | | | |
|---|---|---|---|
| 7,102,262 B2 * | 9/2006 | Ortt | 310/154.11 |
| 2008/0223557 A1 * | 9/2008 | Fulton et al. | 165/104.33 |
| 2009/0212649 A1 * | 8/2009 | Kingman et al. | 310/91 |

FOREIGN PATENT DOCUMENTS

| | | | |
|---|---|---|---|
| JP | 39-029178 U | | 6/1962 |
| JP | 06-141493 A | | 5/1994 |
| JP | 6269143 A | | 9/1994 |
| JP | 2001-025187 A | | 1/2001 |
| JP | 2003-284269 A | | 10/2003 |
| JP | 2008-253025 A | | 10/2008 |
| JP | 2010-233328 A | | 10/2010 |
| JP | 2010233328 A | * | 10/2010 |

OTHER PUBLICATIONS

JP 2010233328 A machine translation Nov. 30, 2013.*
Japanese Office Action, (Notice of Reasons for Rejection) dated Aug. 20, 2013, Patent Application No. 2011-227774.
Japanese Office Action dated Dec. 17, 2013 issued in corresponding Japanese Patent Application No. 2011-227774.
Communication dated Aug. 5, 2014 from the State Intellectual Property Office of the People's Republic of China in counterpart application No. 201210206277.0.

* cited by examiner

*Primary Examiner* — Dang Le
*Assistant Examiner* — Leda Pham
(74) *Attorney, Agent, or Firm* — Sughrue Mion, PLLC; Richard C. Turner

(57) ABSTRACT

A rotary electric machine includes a rotor, a stator having coils wound to surround the rotor, a cylindrical ring member fixedly mounted on the stator by shrinkage fitting, and a frame disposed on the outside of the ring member with a gap created in between. The distance of the gap varies as a result of thermal expansion of the stator and the ring member. An outer surface of the ring member goes into contact with the frame when the stator and the ring member thermally expand, whereby the stator and the ring member are efficiently cooled.

9 Claims, 10 Drawing Sheets

ROTARY ELECTRIC MACHINE

BACKGROUND OF THE INVENTION

1. Field of the Invention

The present invention relates to a structure of a rotary electric machine and, more particularly, to a rotary electric machine capable of efficiently cooling a stator thereof and having excellent magnetic properties.

2. Description of the Background Art

A conventional AC motor includes a stator configured with a plurality of independent stator pieces on which stator coils are wound, the stator pieces being arranged in a ringlike structure, and a stator retaining ring having an opening in which the stator is fixed by press-fitting, wherein the stator retaining ring and a motor housing are fixed by screws. This kind of AC motor is described in Japanese Patent Application Publication No. 2001-025187, for example.

An example of a conventional rotary motor includes a cylindrical aluminum housing, a cylindrical iron sleeve fixedly arranged on a cylindrical inner surface of the housing, and a ring-shaped stator configured with a plurality of stator pieces made of a magnetic material that are fixedly arranged side by side along a circumferential direction on a cylindrical inner surface of the iron sleeve in close contact therewith. The iron sleeve is firmly fit in the housing by shrinkage fitting. Japanese Patent Application Publication No. 2003-284269 describes this kind of rotary motor.

Also, an example of a conventional cooled-casing-type rotary electric machine includes a stator frame in which a coolant passage is formed, the stator frame having an inner circumferential portion serving to retain a stator core. Japanese Patent Application Publication No. 1994-269143 describes this kind of rotary electric machine.

In the aforementioned conventional AC motor, the stator retaining ring and the motor housing are fixed by screws and there is formed a thick layer of air between an outer surface of the stator retaining ring and the motor housing. This AC motor therefore has a problem that the motor can not be sufficiently cooled when the temperature thereof has increased under operating conditions, because the stator and the stator retaining ring can not easily dissipate heat.

In the aforementioned conventional rotary motor, the iron sleeve is firmly fit in the housing by shrinkage fitting so that an outer surface of the iron sleeve and an inner surface of the housing are in close contact with each other. Therefore, the iron sleeve thermally expands when the rotary motor is run and the temperature thereof increases. As a consequence, contact pressure between the iron sleeve and the housing increases by compression, causing a compressive stress in the stator which is disposed in close contact with the inner surface of the iron sleeve. This develops a problem that iron loss in the stator increases under operating conditions, leading to deterioration of magnetic properties.

The aforementioned cooled-casing-type rotary electric machine has the stator frame in which the coolant passage is formed. Thus, the stator frame is cooled by a coolant while the stator thermally expands due to a temperature increase during operation of the rotary electric machine. For this reason, contact pressure between the stator frame and the stator remarkably increases under operating conditions and, as a consequence, there arises a problem that iron loss in the stator increases under operating conditions, leading to deterioration of magnetic properties.

SUMMARY OF THE INVENTION

Intended to solve the aforementioned problems of the prior art, the present invention has as an object the provision of a rotary electric machine capable of efficiently cooling a stator thereof and having excellent magnetic properties.

A rotary electric machine according to the present invention includes a rotor mounted rotatably about a rotary shaft, a stator having a coil wound to surround the rotor, and a frame disposed on the outside of the stator with a gap created in between. The gap has a distance which can vary as a result of thermal expansion of the stator caused by a temperature change, and an outer surface of the stator goes into contact with the frame and is cooled thereby when the stator thermally expands.

The rotary electric machine of this invention includes a rotor mounted rotatably about a rotary shaft, a stator having a coil wound to surround the rotor, and a frame disposed on the outside of the stator with a gap created in between, wherein the gap has a distance which can vary as a result of thermal expansion of the stator caused by a temperature change, and an outer surface of the stator goes into contact with the frame and is cooled thereby when the stator thermally expands. This structure of the invention makes it possible to efficiently cool the stator when the stator thermally expands due to a temperature change during operation of the rotary electric machine, suppress an increase in contact pressure between the stator and the frame and prevent an increase in iron loss in the stator.

The foregoing and other objects, features, aspects and advantages of the present invention will become more apparent from the following detailed description when read in conjunction with the accompanying drawings.

DETAILED DESCRIPTION OF THE PREFERRED EMBODIMENTS OF THE INVENTION

First Embodiment

Figure 1:
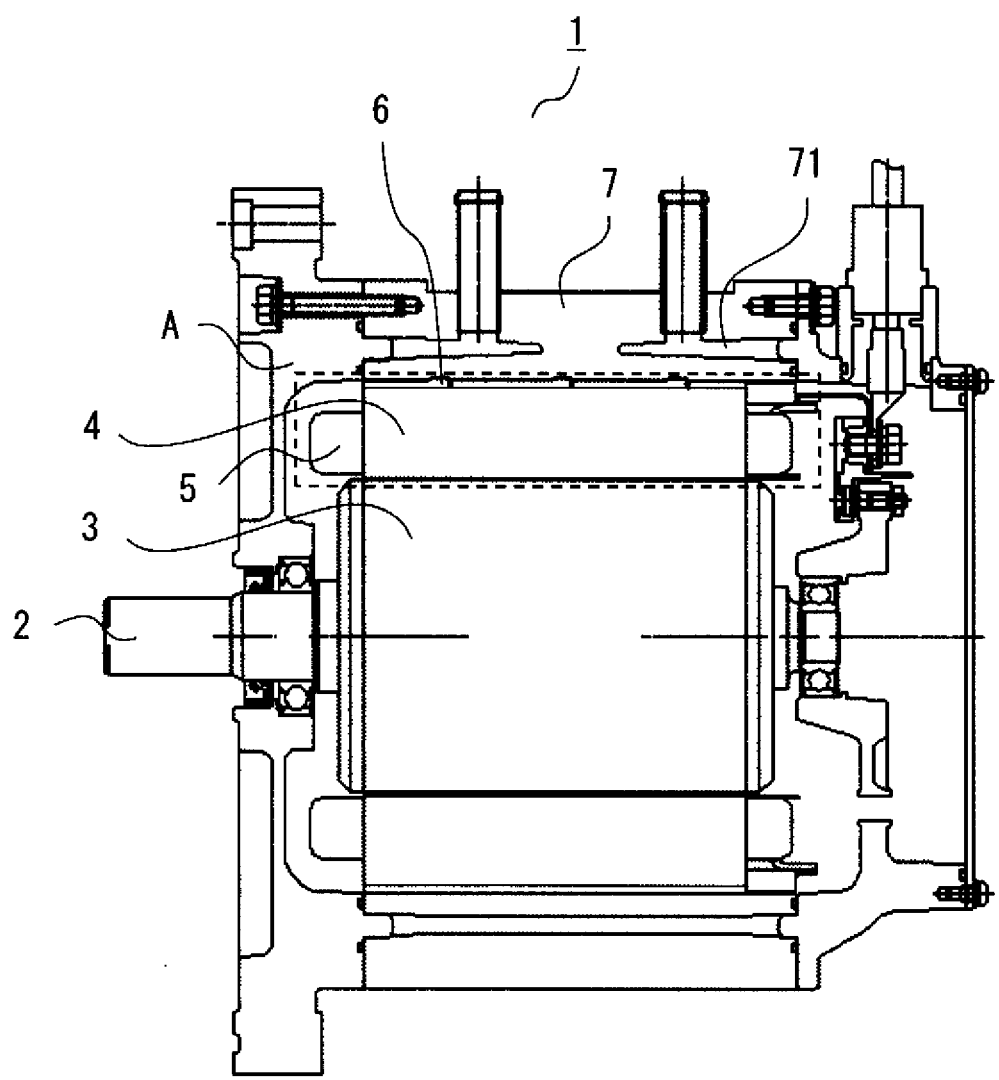
FIG. 1 is a cross-sectional diagram illustrating the configuration of a rotary electric machine according to a first embodiment of the invention.

FIG. 1 is a cross-sectional diagram illustrating the configuration of a rotary electric machine 1 according to a first embodiment of the present invention.

As depicted in FIG. 1, the rotary electric machine 1 includes a rotor 3 mounted on a rotary shaft 2, a ring-shaped stator 4 arranged to surround an outer surface of the rotor 3. The stator 4 essentially made of iron is a split-type stator including a plurality of stator pieces on which coils 5 are wound, the stator pieces being arranged in a ringlike structure. On the outside of an outer periphery of the split-type stator 4, there is provided a cylindrical, thin-walled ring member 6 made of iron which is the same material as that of the stator 4. The ring member 6 and the stator 4 are fixed on a common axis with the ring member 6 mounted on the stator 4 by shrinkage fitting. On the outside of an outer periphery of the ring member 6, there is disposed a cylinder-shaped aluminum frame 7 having an inside diameter which is a little larger than an outside diameter of the ring member 6. As the ring member 6 is fit inside the frame 7, there is created a slight gap 8 between an inner surface of the frame 7 and an outer surface of the ring member 6 (refer to FIG. 2). There is formed a fluid passage 71 within a cylindrical body of the frame 7 for circulating a coolant. Heat generated by the coils 5 when the rotary electric machine 1 is run is dissipated by the coolant circulating through the fluid passage 71 via the stator 4, the ring member 6 and the frame 7.

Figure 2:
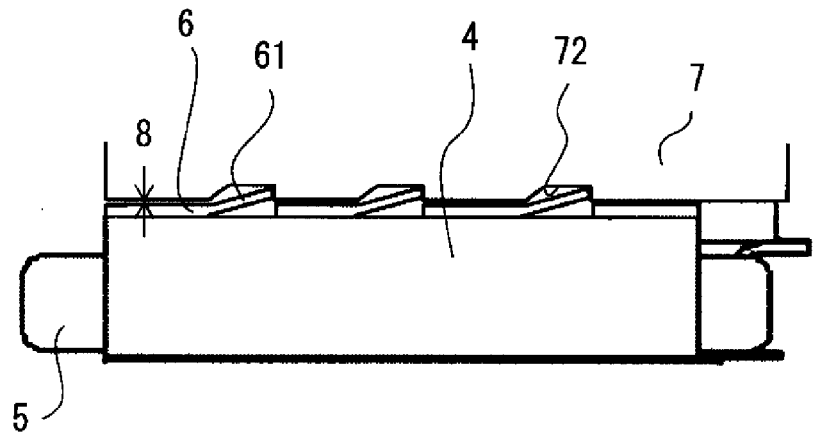
FIG. 2 is a fragmentary enlarged view of a portion A indicated in FIG. 1.
Figure 3:
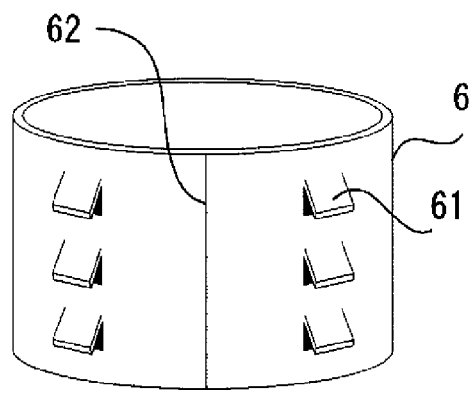
FIG. 3 is a perspective view depicting the structure of a ring member according to the first embodiment of the invention.
Figure 4:
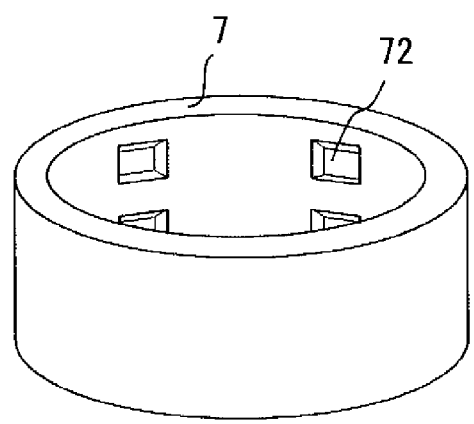
FIG. 4 is a perspective view depicting the structure of a frame according to the first embodiment of the invention.

Structures of the stator 4, the ring member 6 and the frame 7 are described in detail below with reference to FIGS. 2 to 4. FIG. 2 is a diagram depicting an enlarged view of a portion A circumscribed by broken lines in FIG. 1, FIG. 3 is a perspective view depicting the structure of the ring member 6, and FIG. 4 is a perspective view depicting the structure of the frame 7.

As already mentioned, there is provided the ring member 6 on the outside of the stator 4. As the thin-walled ring member 6 is fixed on the stator 4 by shrinkage fitting, an inner surface of the ring member 6 and the outer surface of the stator 4 are in close contact with each other. Because the ring member 6 is thin-walled, the ring member 6 has a small thermal capacity and, thus, the ring member 6 has a high heating efficiency and can be heated by induction heating, for example. For this reason, the ring member 6 can be easily shrink-fit on the stator 4 within a short time, eliminating the need for a large-scale facility for performing shrinkage fitting. Since the stator 4 and the ring member 6 which are fixed together by shrinkage fitting are both made of iron, the two components have the same coefficient of thermal expansion. Therefore, the stator 4 and the ring member 6 similarly expand and shrink when subjected to temperature changes that occur under operating conditions of the rotary electric machine 1, without creating any slack between joint surfaces of the two components. It is to be pointed out that although the stator 4 and the ring member 6 are both made of iron in the first embodiment, what is essential in this invention is that the two components are made of materials having substantially the same coefficient of thermal expansion. This would prevent the occurrence of a slack between the joint surfaces of the stator 4 and the ring member 6 as a result of thermal expansion and shrinkage of the two components caused by temperature changes that occur when the rotary electric machine 1 is run. Additionally, while the stator 4 and the ring member 6 are fixed together by shrinkage fitting in this embodiment, the two components may be joined by press fitting, for example.

The ring member 6 has hooking parts 61 which serve as supporting portions projecting radially outward from the outer surface of the ring member 6, the hooking parts 61 being arranged in three rows in an axial direction of the ring member 6 by four columns located around a circumferential direction thereof. Each of the hooking parts 61 is formed by a cut-and-bend method in which part of a cylindrical wall of the ring member 6 is cut and bent radially outward. Specifically, each of the hooking parts 61 is formed by bending a cut part formed in the ring member 6, the cut part having edges formed along three of four sides of a rectangle excluding one side located on an upper side of the ring member 6 (as illustrated in FIG. 3). The hooking parts 61 thus formed have a springy characteristic. More specifically, the ring member 6 is produced by forming the hooking parts 61 on a thin-walled iron plate, bending the iron plate into a cylindrical shape and, then, welding butt ends of the iron plate to form a welded joint 62, for example. Incidentally, the number and locations of the hooking parts 61 are not limited to the above-described example but may be determined as appropriate in accordance with specific requirements. The shape of each hooking part may also be modified as necessary. It will be possible to form hooking parts having a complex shape by using the aforementioned method in which the ring member 6 is produced by forming the hooking parts 61 on an iron plate and bending the iron plate into a cylindrical shape.

In the inner surface of the frame 7, there are formed recesses 72 which are located at positions corresponding to the hooking parts 61 of the ring member 6. As the ring member 6 is inserted into the frame 7, the hooking parts 61 fit into and become retained by the recesses 72, whereby the ring member 6 and the frame 7 are correctly positioned in both the axial and circumferential directions at the same time. As the hooking parts 61 have the springy characteristic, end portions of the hooking parts 61 push against the recesses 72 in radial directions so that the ring member 6 is held within the frame 7 with the uniform gap 8 formed therebetween. The springy characteristic of the hooking parts 61 also serve to cancel out variations in dimensions of the ring member 6 and frame 7, making it possible to easily match central axes of the ring member 6 and frame 7. This structure serves to absorb vibrations and reduce acoustic noise during operation of the rotary electric machine 1.

While the ring member 6 and the frame 7 are supported with the gap 8 formed in between during assembly of the individual components of the rotary electric machine 1, such as the stator 4, the ring member 6 and the frame 7, as mentioned in the foregoing discussion, the distance of the gap 8 can vary as a result of thermal expansion of the stator 4, the ring member 6 and the frame 7 caused by temperature changes during operation of the rotary electric machine 1. The gap 8 is initially set to have such a dimension that the outer surface of the ring member 6 goes into close contact with the inner surface of the frame 7, making it possible to cool the ring member 6, when the individual components like the stator 4 reach temperatures falling within a temperature range in which heat built up in the individual components should be dissipated. Described below is how the distance of the gap 8 is preset.

Here, the distance of the gap 8 is discussed taking into consideration the amount of increase in interference between the ring member 6 and the frame 7 caused by temperature changes under conditions where the outer surface of the ring member 6 and the inner surface of the frame 7 are in mutual contact, that is, the two components are supported with the distance of the gap 8 set to zero, during assembly of the rotary electric machine 1. The term "interference" used herein refers to the difference between the outside diameter of the ring member 6 and the inside diameter of the frame 7. When the ring member 6 and the frame 7 are supported with the gap distance zero, the amount of the interference is equal to zero, and when the ring member 6 and the frame 7 thermally expand due to temperature changes, the amount of the interference increases. The following discussion presents examples of how the amount of increase in the interference is determined.

The amount of increase in the interference is determined using an example in which the rotary electric machine 1 is structured such that the stator 4 has an inside diameter of 173 mm and an outside diameter of 200 mm, the frame 7 has an inside diameter of 204 mm and an outside diameter of 216 mm, and the ring member 6 has a thickness of 2 mm. In this example, it is assumed that the coefficient of linear expansion of aluminum used as a material forming the frame 7 is $2.1 \times 10^{-5}/°$ C. and the coefficient of linear expansion of iron used as a material forming the stator 4 and the ring member 6 is $1.3 \times 10^{-5}/°$ C. It is also assumed that the temperature of the rotary electric machine 1 is 20° C. during assembly thereof and the temperature of the frame 7 is within a range of –30° C. to 40° C. while the rotary electric machine 1 is run.

Figure 5:
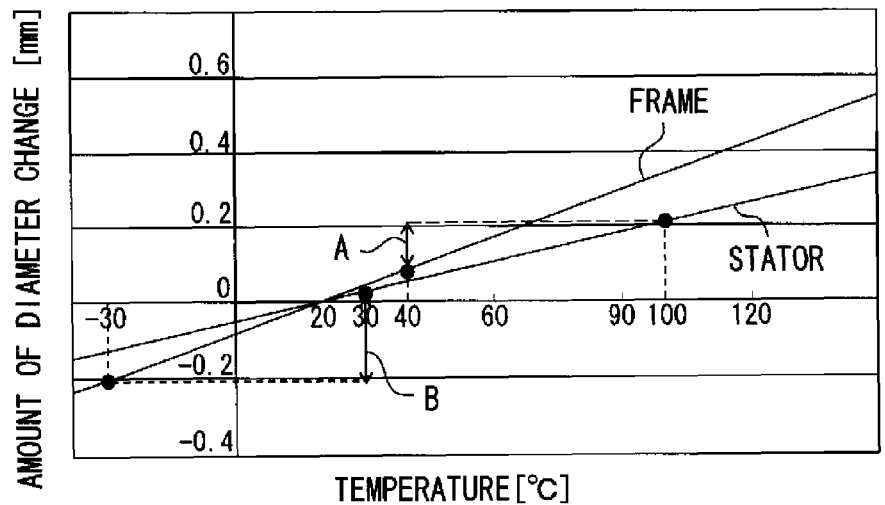
FIG. 5 is a diagram representing how diameters of a stator and the frame of the first embodiment vary with temperature changes according to the first embodiment.

FIG. 5 is a diagram representing how diameters of the stator 4 and the frame 7 vary in relation to temperature changes. Here, a further assumption is made that the stator 4 and the ring member 6 remain at the same temperature because these components are made of the same material, i.e. iron and these components are fixed together by shrinkage fitting, and the amount of change in the diameter of the stator 4 includes that of the ring member 6. The temperature 20° C. of the rotary electric machine 1 during assembly thereof is used as a reference temperature and either of the amount of change in the diameter of the frame 7 and that of the stator 4 is zero at 20° C. When the frame 7 is at 40° C. and the stator 4 is at 100° C., for example, there is a difference A of about 0.12 mm between the amount of change in the diameter of the former and that of the latter. Also, when the frame 7 is at –30° C. and the stator 4 is at 30° C., there is a difference B of about 0.24 mm between the amount of change in the diameter of the former and that of the latter.

Figure 6:
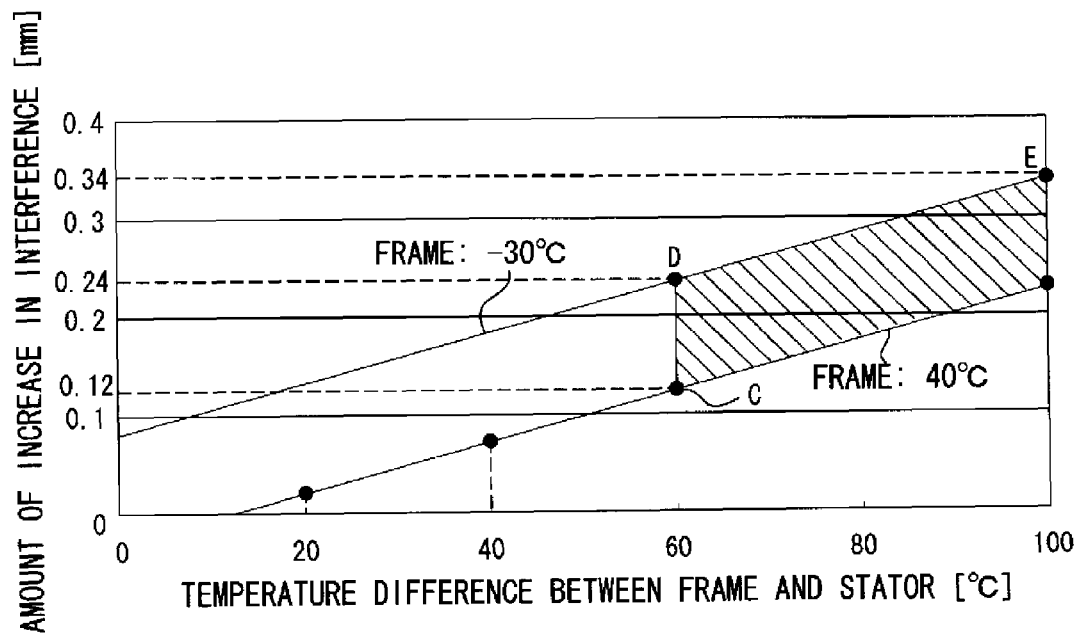
FIG. 6 is a diagram indicating a relationship between temperature differences between the stator and the frame and the amount of increase in interference therebetween according to the first embodiment.

Under the assumption that the ring member 6 and the frame 7 are supported with the gap distance zero during assembly as mentioned above, the difference between the amount of change in the diameter of the frame 7 and that of the stator 4 explained above referring to FIG. 5 corresponds to the amount of increase in interference between the ring member 6 and the frame 7 caused by a temperature change. FIG. 6 is a diagram indicating a relationship between temperature differences between the frame 7 and the stator 4 and the amount of increase in interference therebetween when the frame 7 is at –30° C. (shown by an upper solid line) and at 40° C. (shown by a lower solid line). Point C shown in FIG. 6 indicates, for example, that the amount of increase in interference between the ring member 6 and the frame 7 is approximately 0.12 mm when the frame 7 is at 40° C. and the stator 4 is at 100° C. Also, point D shown in FIG. 6 indicates that the amount of increase in interference is approximately 0.24 mm when the frame 7 is at –30° C. and the stator 4 is at 30° C.

Considering such properties as heat resistance of internal components of the rotary electric machine 1, it is assumed that the rotary electric machine 1 is in a range wherein heat built up in the individual components should be dissipated when there is a temperature difference of 60° C. or more between the stator 4 and the frame 7, a permissible upper limit of the temperature difference being 100° C. This range is represented by a hatched area in FIG. 6. Point C shown in FIG. 6 is a point where the amount of increase in interference between the ring member 6 and the frame 7 is minimized within the hatched area of FIG. 6. The amount of increase in interference is approximately 0.12 mm at point C of FIG. 6 when the frame 7 is at 40° C. and the stator 4 is at 100° C. as mentioned above.

On the basis of results of close examination of the above-described example, a maximum value of the distance of the gap 8 at which the outer surface of the ring member 6 goes into close contact with the inner surface of the frame 7 can be set at 0.12 mm in the temperature range wherein heat dissipation should be done according to the first embodiment. It follows that if the distance of the gap 8 is set to 0.12 mm or less, the outer surface of the ring member 6 goes into contact with the frame 7 having the internal fluid passage 71 for circulating the coolant, making it possible to efficiently cool the stator 4 and the ring member 6 within the entire temperature range in which it is expected that heat should be dissipated.

On the other hand, point E shown in FIG. 6 is a point where the amount of increase in interference between the ring member 6 and the frame 7 is maximized within the hatched area of FIG. 6 in which it is expected that heat should be dissipated. At point E, the frame 7 is at –30° C., the stator 4 is at 70° C. and the amount of increase in interference is approximately 0.34 mm. What is represented by point E at which the amount of increase in interference is maximized is a situation where a contact pressure between the ring member 6 and the frame 7 is maximized.

Figure 7:
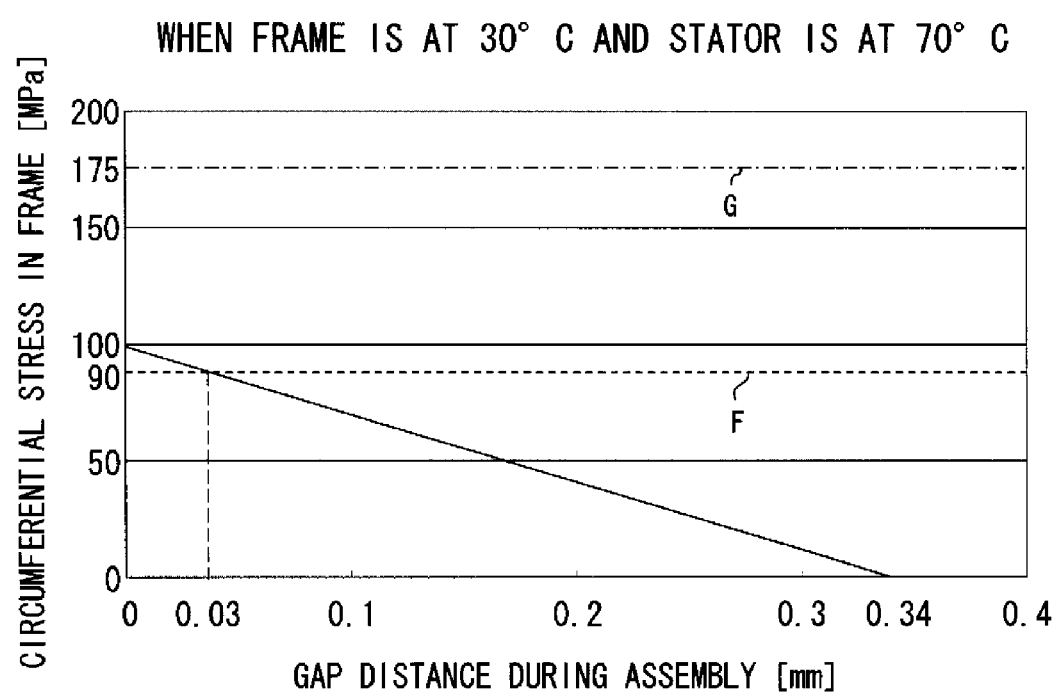
FIG. 7 is a diagram indicating a relationship between the distance of a gap between the ring member and the frame during assembly and a circumferential stress that occurs in the frame according to the first embodiment.

A solid line shown in FIG. 7 represents a relationship between the distance of the gap 8 during assembly and a circumferential stress that occurs in the frame 7 when the frame 7 is at –30° C. and the stator 4 is at 70° C. As the amount of increase in interference is approximately 0.34 mm at point E shown in FIG. 6, the circumferential stress occurring in the frame 7 is zero if the distance of the gap 8 during assembly is 0.34 mm. If the distance of the gap 8 during assembly is zero, a circumferential stress of approximately 100 MPa will occur in the frame 7.

If the frame 7 is made of an aluminum die-cast (ADC) material, for example, the frame 7 has a yield strength of 180 MPa against the circumferential stress. In a case where the frame 7 is used at a safety factor of 2 or above, that is, when the circumferential stress occurring in the frame 7 is 90 MPa or less (shown by a broken line F in FIG. 7), the distance of the gap 8 during assembly should preferably be made equal to or larger than 0.03 mm.

If the distance of the gap 8 is initially set to 0.03 mm, a calculated compressive stress that will occur in an outer surface of the stator 4 when the frame 7 is at –30° C. and the stator 4 is at 70° C. is approximately 75 MPa. This compressive stress results from a combination of a contact pressure that occurs when the ring member 6 is shrink-fit on the stator 4 and a contact pressure exerted by the frame 7 as a result of thermal expansion of the individual components due to a temperature increase thereof.

The above-described structure of the present embodiment is further examined using a comparative example of a rotary electric machine in which a frame having an inside diameter of 200 mm and an outside diameter of 216 mm is directly shrink-fit on a stator having an inside diameter of 173 mm and an outside diameter of 200 mm. In this rotary electric machine, a circumferential stress that occurs in the frame when the frame is at −30° C. and the stator is at 70° C. is approximately 175 MPa (shown by a dot-and-dash line G in FIG. 7). It is recognized that the value of the circumferential stress that occurs in the frame 7 of the first embodiment when the gap distance is initially set to 0.03 mm is remarkably smaller than the value of the circumferential stress that occurs in the frame of the comparative example. Additionally, a calculated compressive stress that will occur in an outer surface of the stator of the comparative example is approximately 107 MPa. Thus, it is also recognized that the value of the compressive stress that will occur in the outer surface of the stator 4 of the first embodiment when the gap distance is initially set to 0.03 mm is much smaller than the value of the compressive stress that will occur in the stator of the comparative example. Incidentally, the compressive stress that will occur in the stator of the comparative example results from a combination of a contact pressure that occurs when the frame is shrink-fit on the stator and a contact pressure exerted by the frame as a result of thermal expansion of individual components due to a temperature increase thereof.

It is understood from the above that by presetting the distance of the gap 8 to 0.03 mm or more it is possible to prevent an increase in the compressive stress occurring in the outer surface of the stator 4 without producing an excessive circumferential stress in the frame 7 regardless of temperature increase.

It is appreciated from results of the aforementioned examination that if the distance of the gap 8 is set within a range of 0.03 mm to 0.12 mm in the structure of the first embodiment, the outer surface of the ring member 6 goes into contact with the inner surface of the frame 7, making it possible to efficiently cool the individual components within the entire temperature range in which it is expected that heat should be dissipated. Additionally, this arrangement of the embodiment serves to prevent an increase in the compressive stress occurring in the outer surface of the stator 4 as a result of thermal expansion of the stator 4, the ring member 6 and the frame 7. If it is intended to set the gap distance to 0.03 mm in the structure of the first embodiment, for example, it is possible to create the gap 8 of 0.03 mm between the ring member 6 and the frame 7 by grinding the outer surface of the aforementioned 2-mm-thick ring member 6 by as much as 0.03 mm.

The foregoing discussion has been based on the assumption that the frame 7 is in a temperature range of −30° C. to 40° C. while the rotary electric machine 1 is run and it is expected necessary that heat built up in the individual components should be dissipated if the temperature difference between the frame 7 and the stator 4 falls within a range of 60° C. to 100° C. This assumption may however be altered as appropriate in accordance with operating conditions or the purpose of use of the rotary electric machine 1, for instance.

An optimum thickness of the ring member 6 is now considered hereunder. As the ring member 6 is shrink-fit on the stator 4 in the above-described structure of the present embodiment, a contact pressure is exerted on the outer surface of the stator 4. The contact pressure exerted on the stator 4 as a result of shrinkage fitting increases with the thickness of the ring member 6. While the compressive stress that occurs in the outer surface of the stator 4 is approximately 75 MPa under conditions where the distance of the gap 8 is initially set to 0.03 mm, the frame 7 is at −30° C. and the stator 4 is at 70° C. in the structure of the first embodiment, this compressive stress results from the combination of the contact pressure that occurs when the ring member 6 is shrink-fit on the stator 4 and the contact pressure exerted by the frame 7 as a result of thermal expansion of the individual components due to a temperature increase thereof as mentioned earlier. Thus, the compressive stress occurring in the outer surface of the stator 4 increases as the contact pressure occurring as a result of shrinkage fitting increases. Taking this in mind, the compressive stress that occurs in the outer surface of the stator 4 has been determined under conditions where the thickness of the ring member 6 was gradually increased when the gap distance was initially set to 0.03 mm, the frame 7 was at −30° C. and the stator 4 was at 70° C. Consequently, it has been determined that the compressive stress that occurred in the outer surface of the stator 4 took the same value as in the aforementioned comparative example when the outside diameter of the stator 4 was 200 mm and the thickness of the ring member 6 was 5 mm, that is, when the thickness of the ring member 6 was 2.5% of the outside diameter of the stator 4. This indicates that the optimum thickness of the ring member 6 is 2.5% or less of the outside diameter of the stator 4.

As described in the foregoing, the rotary electric machine 1 of the first embodiment is structured such that the ring member 6 and the frame 7 are arranged with the gap 8 created in between, the distance of the gap 8 being variable as a result of thermal expansion of the ring member 6 caused by temperature changes, and the individual components are cooled as the outer surface of the ring member 6 goes into contact with the frame 7 as a result of a change in the gap distance therebetween.

Therefore, it is possible to efficiently cool the stator 4 and ring member 6 when heat built up in these components needs to be dissipated. Additionally, it is possible to prevent an increase in iron loss in the stator 4 by suppressing an increase in the compressive stress that occurs in the outer surface of the stator 4 as a result of thermal expansion of the stator 4, the ring member 6 and the frame 7 and thereby improve magnetic properties of the rotary electric machine 1. Durability of the rotary electric machine 1 is also improved as no excessive circumferential stress is produced in the frame 7. Furthermore, the structure of the embodiment provides an advantage that the ring member 6 is kept from turning during operation of the rotary electric machine 1 because the outer surface of the ring member 6 goes into contact with the frame 7.

Also, as the frame 7 is fit on the outside of the ring member 6 with the slight gap 8 created in between without using a shrinkage fitting or press-fitting technique, there is no need for any large-scale facilities for performing a shrinkage fitting or press-fitting process. This feature serves to reduce environmental load caused by manufacturing facilities.

Furthermore, as the ring member 6 is supported within the frame 7 with the aid of the hooking parts 61 provided on the ring member 6 constituting a springlike structure and the recesses 72 formed in the frame 7, it is possible to support the ring member 6 within the frame 7 with the uniform gap 8 created in between with a simple structure. This structure facilitates mutual positioning of the ring member 6 and the frame 7 in both the axial and circumferential directions. The structure of the embodiment also serves to reliably prevent the ring member 6 from turning relative to the frame 7 while the rotary electric machine 1 is run.

Also, as the hooking parts 61 constitute the springlike structure as mentioned above, the hooking parts 61 serve to cancel out dimensional variations of the ring member 6 and the frame 7 due to poor machining accuracy thereof, making it easy to match the central axes of the ring member 6 and frame 7. This structure also serves to absorb vibrations and reduce acoustic noise during operation of the rotary electric machine 1.

Figure 8:
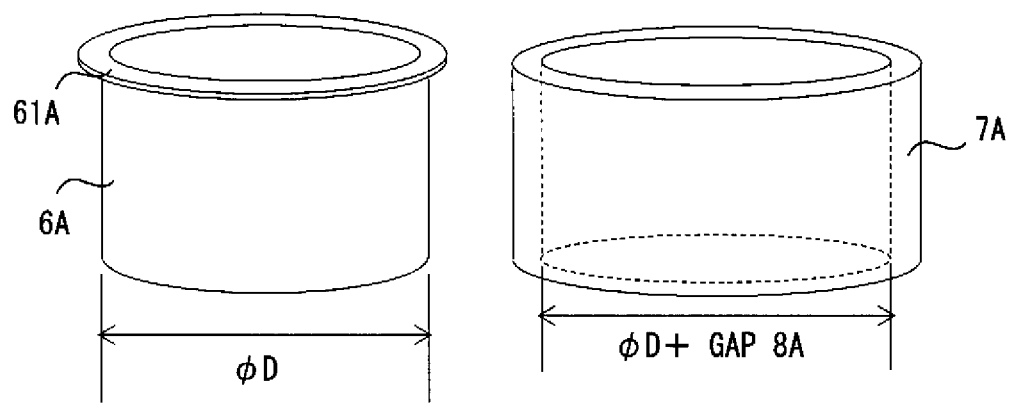
FIG. 8 is a diagram illustrating a support mechanism for supporting a ring member in a frame according to a variation of the first embodiment.

While the hooking parts 61 provided on the ring member 6 hook into and become retained by the recesses 72 formed in the frame 7 in the above-described first embodiment, this structure may be modified such that the recesses 72 are not formed in the frame 7 and the ring member 6 is supported by the frame 7 only with an elastic restoring force exerted by the hooking parts 61 formed on the ring member 6. Also, the invention is not limited to the above-described support mechanism employed for supporting the ring member 6 within the frame 7. The rotary electric machine 1 may employ any kind of support mechanism in which a ring member is supported within a frame with such a gap formed in between that allows an outer surface of the ring member to go into contact with the frame as a result of thermal expansion of the former. For example, the rotary electric machine 1 may employ a support mechanism as depicted in FIG. 8 in which a ring member 6A having a flange portion 61A which serves as a supporting portion projecting radially outward from an upper end of an outer surface of the ring member 6A is inserted into a frame 7A, and the flange portion 61A is screwed or bonded to the frame 7A so that the ring member 6A is supported by the frame 7A with a gap 8A created in between.

In the above-described structure of the present embodiment in which the hooking parts 61 of the ring member 6 hook into and become retained by the recesses 72 formed in the frame 7, pushing forces exerted by the hooking parts 61 of the ring member 6 may potentially produce a local stress in the frame 7 especially at the recesses 72 formed therein. One approach to prevent permanent deformation of the frame 7 due to such stress would be to strengthen the frame 7 by forming a cast-iron layer on the inner surface of the frame 7, for example.

While the fluid passage 71 for circulating the coolant is formed within the cylindrical body of the frame 7 in the first embodiment, the location of the fluid passage 71 is not limited thereto. For example, a fluid passage for circulating the coolant may be formed on an outer surface of the frame or a fluid passage may be formed in such vicinity of the frame that is close enough to cool the frame. Also, while it is possible to cool the stator and the ring member quite efficiently if the fluid passage for circulating the coolant is formed within the cylindrical body of the frame, the fluid passage for the coolant need not necessarily be formed within the frame. This is because the frame is in direct contact with ambient air and the stator and the ring member can be cooled as long as the frame is in contact with the ring member.

Furthermore, although the stator 4 is a split-type stator in the foregoing first embodiment, the stator 4 need not necessarily be of a split-type. For example, it is possible to employ a structure in which a ring member is shrink-fit on a non-split-type stator configured with a single-structured ringlike iron core and then the ring member is supported within a frame with a slight gap formed in between. This structure also provides the same advantage as provided by the structure of the first embodiment.

It is to be pointed out that when employing a non-split-type stator configured with a single-structured iron core, it is possible to structure a rotary electric machine without any ring member. If the rotary electric machine is structured such that the stator is supported directly by the frame with a gap created in between without the provision of a ring member wherein an outer surface of the stator goes into contact with the frame when the stator expands due to a temperature change, it is possible to produce the same advantage as provided by the above-described structure of the first embodiment.

Second Embodiment

Figure 9:
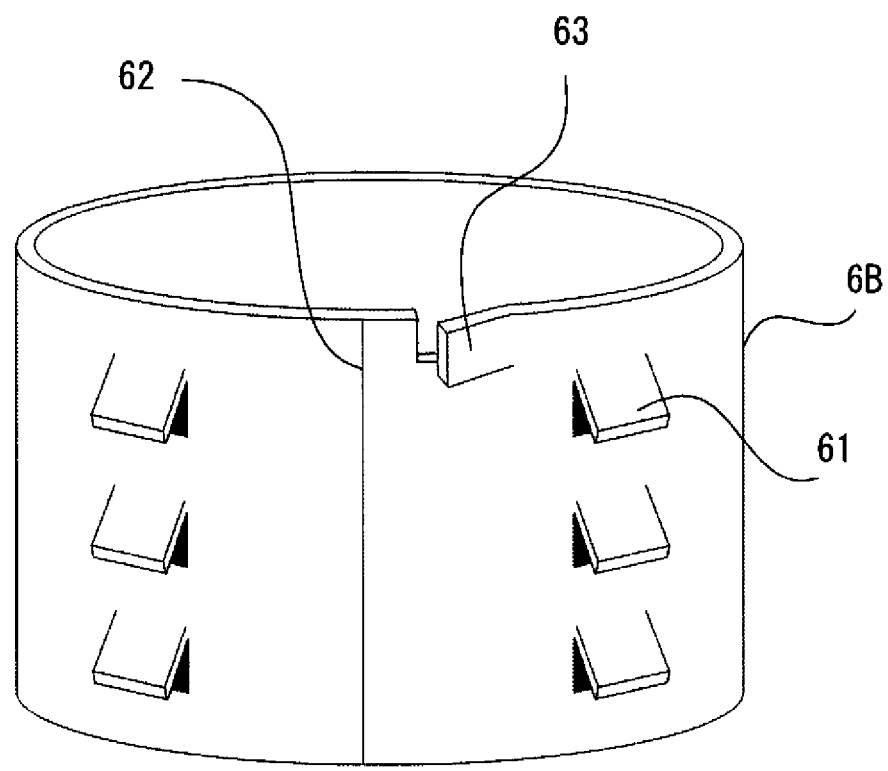
FIG. 9 is a perspective view depicting the structure of a ring member according to a second embodiment of the invention.

FIG. 9 is a perspective view depicting the structure of a ring member 6B of a rotary electric machine 1B according to a second embodiment of the present invention. The ring member 6B has a second hooking part 63 which serves as a supporting portion in addition to hooking parts 61 which are structured in the same fashion as those of the above-described first embodiment. The second hooking part 63 of the second embodiment which is located at an uppermost axial end (as illustrated) of the ring member 6B is formed by cutting and bending part of the ring member 6B along a direction deviating from a cut-and-bend direction of the hooking parts 61 by 90 degrees. A frame 7B which supports the ring member 6B is provided with a second recess in which the second hooking part 63 is retained at a location corresponding to the second hooking part 63. The rotary electric machine 1B is structured in otherwise the same fashion as the rotary electric machine 1 of the foregoing first embodiment, and elements like those of the first embodiment are designated by the same symbols and a description of such elements is not given here.

In this embodiment, the hooking parts 61 and the second hooking part 63 formed in different cut-and-bend directions fit into and become retained by the recesses 72 and the second recess formed in the frame 7B, respectively, as described above. Therefore, the second embodiment provides, in addition to the aforementioned advantage of the first embodiment, such an advantage that the ring member 6B is more securely kept from turning relative to the frame 7B during operation of the rotary electric machine 1B.

Third Embodiment

Figure 10:
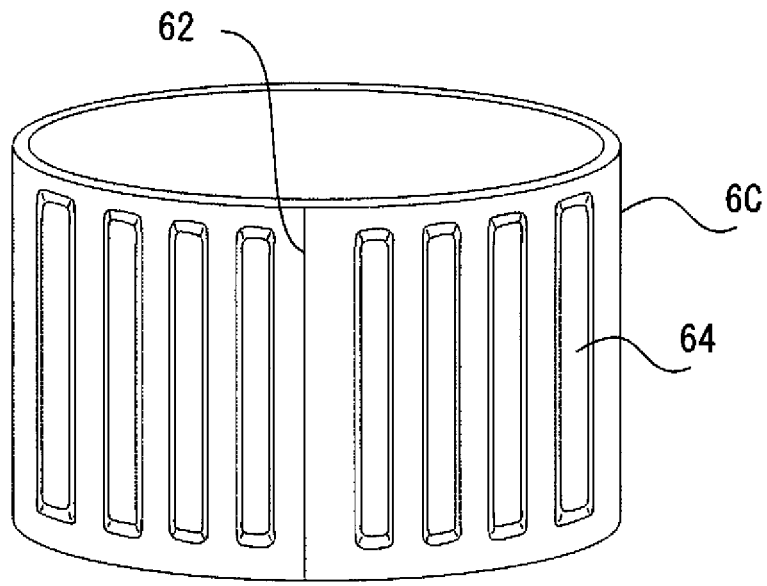
FIG. 10 is a perspective view depicting the structure of a ring member according to a third embodiment of the invention.

FIG. 10 is a perspective view depicting the structure of a ring member 6C of a rotary electric machine 1C according to a third embodiment of the present invention. The ring member 6C employed in this embodiment is a tolerance ring of which entire ring structure has a springy characteristic. Specifically, the ring member 6C employed in the third embodiment is a tolerance ring having a plurality of protrusions 64 formed on an outer surface of the ring member 6C to extend along an axial direction thereof. A frame 7C employed in the third embodiment has a simple thin-walled cylindrical structure unlike the ring member 6 of the first embodiment in which the recesses 72 are formed. The plurality of protrusions 64 serve as supporting portions for supporting the ring member 6C within the frame 7C. To be more specific, the protrusions 64 serving as the supporting portions are in contact with an inner surface of the frame 7C so that the ring member 6C is supported on the inside of the frame 7C with a slight gap created in between. The rotary electric machine 1C is structured in otherwise the same fashion as the rotary electric machine 1 of the foregoing first embodiment, and elements like those of the first embodiment are designated by the same symbols and a description of such elements is not given here.

Since the ring member 6C of this embodiment is a tolerance ring, the entire ring structure including the protrusions 64 which serve as the supporting portions has springiness as described above. Therefore, the third embodiment provides, in addition to the aforementioned advantage of the first embodiment, such an advantage that the springiness of the entire ring structure of the ring member 6C cancels out variations in dimensions of the frame 7C due to poor machining accuracy thereof, making it easy to match central axes of the ring member 6C and frame 7C. This also serves to facilitate assembly. In addition, the structure of the third embodiment serves to absorb vibrations and reduce acoustic noise during operation of the rotary electric machine 1C.

Fourth Embodiment

Figure 11:
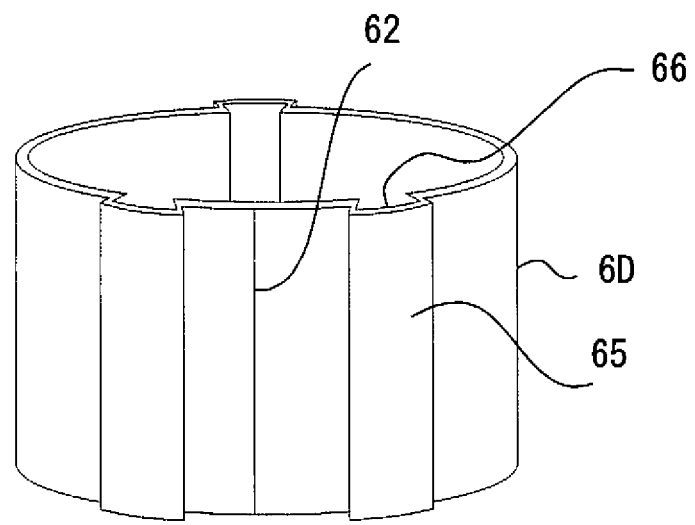
FIG. 11 is a perspective view depicting the structure of a ring member according to a fourth embodiment of the invention.
Figure 12:
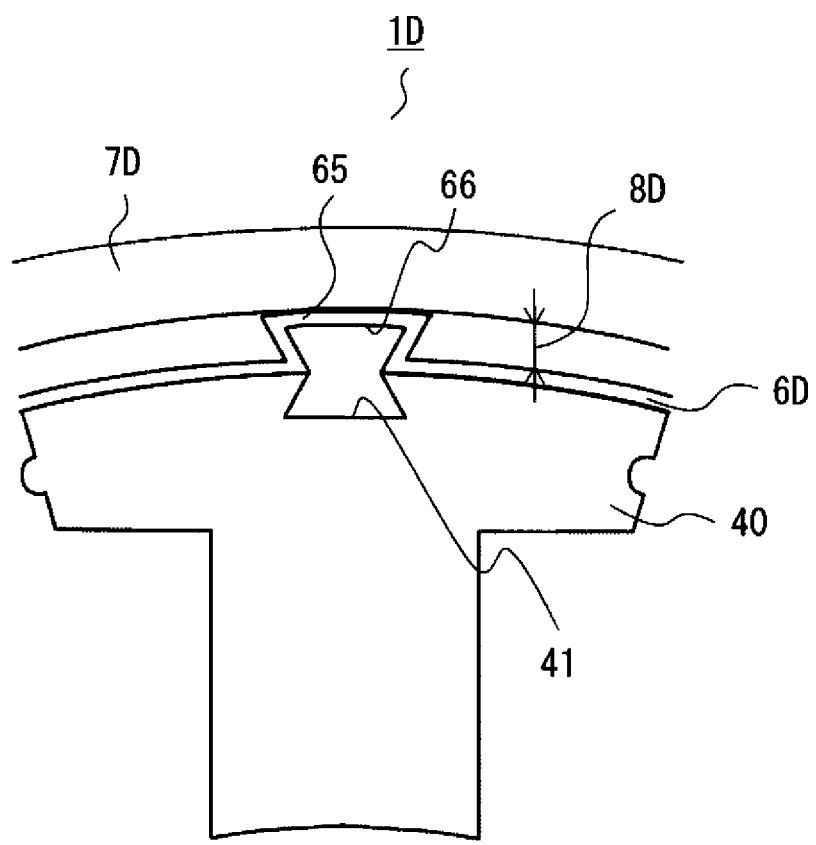
FIG. 12 is a fragmentary cross-sectional view schematically depicting the structure of a rotary electric machine according to the fourth embodiment of the invention.

FIG. 11 is a perspective view depicting the structure of a ring member 6D of a rotary electric machine 1D according to a fourth embodiment of the present invention, and FIG. 12 is a fragmentary cross-sectional view schematically depicting the structure of the ring member 6D. FIG. 12 shows a cross section taken along a surface at right angles to a rotary shaft 2 of the rotary electric machine 1D, depicting in particular an enlarged view of the proximity of one of a plurality of stator pieces 40 constituting a stator 4.

As illustrated in the Figures, the ring member 6D of this embodiment differs from the ring member 6 of the foregoing first embodiment including the structure of the supporting portions thereof. Supporting portions 65 of the ring member 6D are structured to have protruding parts each having an inverted trapezoidal cross section formed on an outer surface of the ring member 6D, extending along an axial direction thereof, as well as dovetail grooves 66 formed in inside surfaces of the individual supporting portions 65. The ring member 6D having such supporting portions 65 can be formed by bending a thin-walled iron plate to produce protrusions having generally a trapezoidal cross-sectional shape, bending the iron plate into a generally cylindrical shape, and then welding butt ends of the iron plate to produce a welded joint 62, for example. In this fourth embodiment, three such supporting portions 65 are formed in the above-described manner. In an inner surface of a frame 7D of this embodiment, there are not formed any recesses like those of the first embodiment. The ring member 6D is supported within the frame 7D with a gap 8D created in between as outermost surfaces of the individual supporting portions 65 of the ring member 6D are in contact with the inner surface of the frame 7D. The supporting portions 65 of this embodiment may be structured to provide a desired level of springiness by properly determining the angle of bending of the supporting portions 65 and/or the thickness of the ring member 6D. The rotary electric machine 1D is structured in otherwise the same fashion as the rotary electric machine 1 of the foregoing first embodiment, and elements like those of the first embodiment are designated by the same symbols and a description of such elements is not given here.

In this fourth embodiment, the supporting portions 65 provided on the outer surface of the ring member 6D are shaped to have the dovetail grooves 66 formed in the inside surfaces of the protruding parts each having the inverted trapezoidal cross section extending along the axial direction of the ring member 6D as described above. Therefore, the fourth embodiment provides, in addition to the aforementioned advantage of the first embodiment, such an advantage that the above-described structure of the present embodiment serves to keep compressive stresses exerted on the stator pieces 40 due to mechanical contact of the outermost surfaces of the supporting portions 65 and the frame 7D from being transmitted directly to the respective stator pieces 40 and to distribute the compressive stresses over entire outer surfaces of the stator pieces 40. For this reason, the structure of the embodiment makes it possible to prevent deterioration of magnetic properties of the rotary electric machine 1D due to an increase in local compressive stresses.

Optionally, the structure of the embodiment may be such that elastic members are disposed in the dovetail grooves 66 formed in the inside surfaces of the individual supporting portions 65 in order to strengthen the supporting portions 65 and support the ring member 6D within the frame 7D more securely.

While one of the supporting portions 65 is depicted in an exaggerated fashion in FIG. 12 to facilitate understanding of the structure of the supporting portions 65, the gap 8D is a slight gap like the one described in the foregoing first embodiment and, therefore, the outer surface of the ring member 6D naturally goes into contact with the inner surface of the frame 7D when the ring member 6D thermally expands, making it possible to cool the ring member 6D by way of the frame 7D.

FIG. 12 depicts one of cutouts 41 formed in the outer surfaces of the stator pieces 40. These cutouts 41 are cutouts commonly used when arranging the plurality of stator pieces 40 in a cylindrical configuration. If the supporting portions 65 of the ring member 6D are disposed at locations corresponding to the individual cutouts 41, it will be possible to distribute the compressive stresses exerted on the stator pieces 40 due to mechanical contact of the outermost surfaces of the supporting portions 65 and the frame 7D in a more reliable fashion.

Fifth Embodiment

Figure 13:
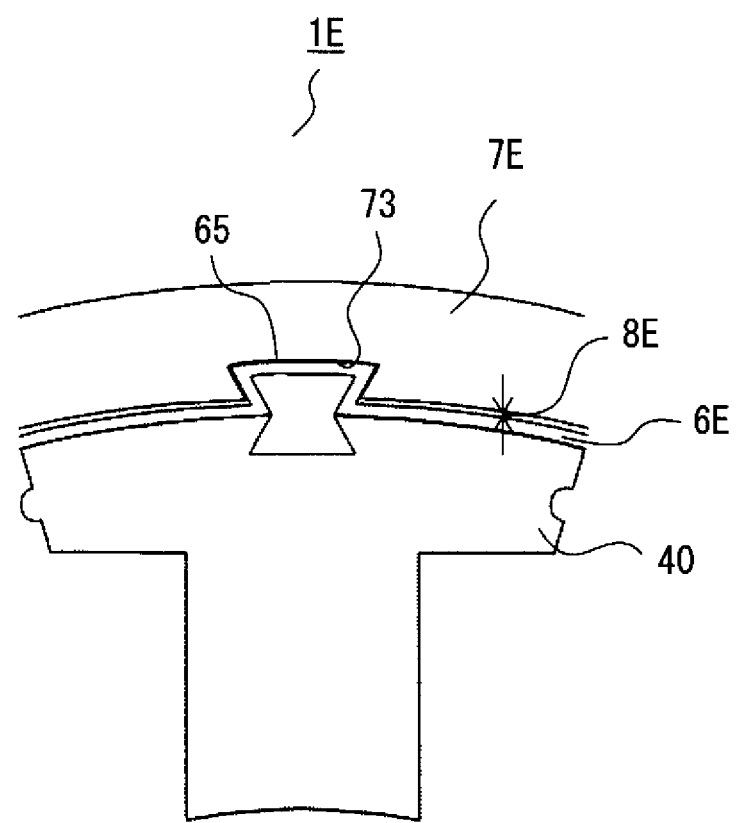
FIG. 13 is a fragmentary cross-sectional view schematically depicting the structure of a rotary electric machine according to a fifth embodiment of the invention.

FIG. 13 is a fragmentary cross-sectional view schematically depicting the structure of a rotary electric machine 1E according to a fifth embodiment of the present invention. FIG. 13 shows a cross section taken along a surface at right angles to a rotary shaft 2 of the rotary electric machine 1E, depicting in particular an enlarged view of the proximity of one of a plurality of stator pieces 40 constituting a stator 4.

The structure of the fifth embodiment is one variation of the above-described structure of the fourth embodiment. A ring member 6E of the fifth embodiment is structured in the same fashion as the ring member 6D of the fourth embodiment. In this fifth embodiment, a frame 7E has dovetail grooves 73 formed in an inner surface thereof for fitting supporting portions 65 formed on the ring member 6E. When the individual supporting portions 65 are fit into the dovetail grooves 73, the ring member 6E is supported within the frame 7E with a gap 8E created in between.

In this fifth embodiment, the frame 7E has the dovetail grooves 73 formed therein and the supporting portions 65 formed on the ring member 6E are fit into the dovetail grooves 73. Therefore, the fifth embodiment provides, in addition to the aforementioned advantage of the fourth embodiment, such an advantage that the ring member 6E is securely kept from turning relative to the frame 7E.

Figure 14:
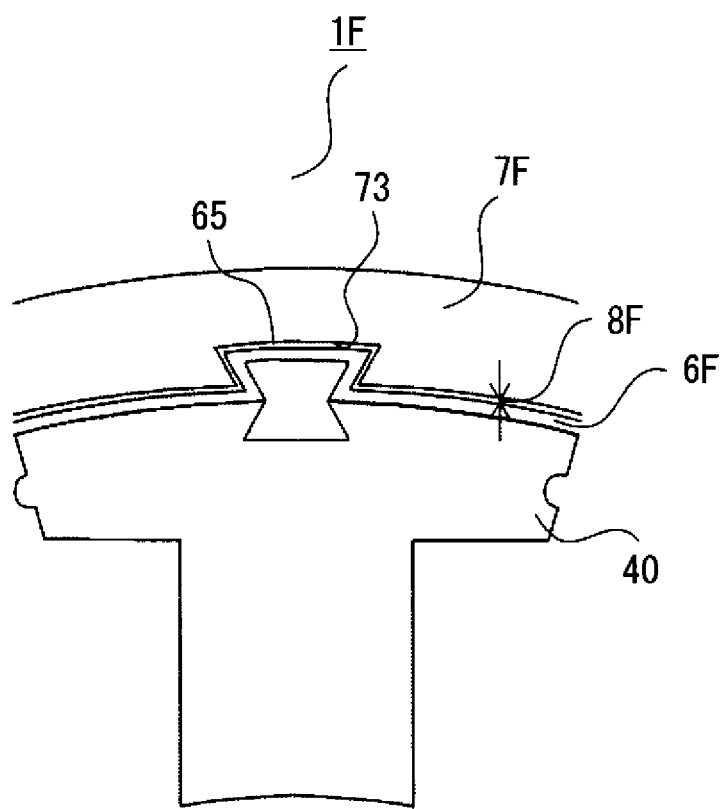
FIG. 14 is a fragmentary cross-sectional view schematically depicting the structure of a rotary electric machine according to one variation of the fifth embodiment of the invention.

The rotary electric machine 1E of the fifth embodiment may be varied as illustrated in FIG. 14, for example, in which a rotary electric machine 1F is structured such that a gap 8F is created also between dovetail grooves 73F of a frame 7F and supporting portions 65 of a ring member 6F. In this variation of the fifth embodiment, the ring member 6F can be supported within the frame 7F by means of hooking parts like those of the first embodiment formed on an outer surface of the ring member 6F, for example.

While the invention has been described with reference to the specific embodiments thereof, the above-described structures of the individual embodiments may be freely combined, modified or simplified as appropriate. In other words, various modifications and alterations of this invention will be apparent to those skilled in the art without departing from the scope and spirit of the invention, and it should be understood that this is not limited to the illustrative embodiments set forth herein.

What is claimed is:

1. A rotary electric machine comprising:
a rotor mounted rotatably about a rotary shaft;
a stator having a coil wound to surround said rotor; and
a frame disposed on the outside of said stator with a gap created in between;
wherein said gap has a distance which is configured to vary as a result of thermal expansion of said stator caused by a temperature change, and an outer surface of said stator comes into contact with said frame and said stator is cooled when said stator thermally expands, and
wherein said stator is provided with a ring member disposed on the outside of said stator between said stator and said gap, said ring member is arranged to surround an outer surface of said stator, the distance of said gap is configured to vary as a result of thermal expansion of said stator and said ring member caused by a temperature change, and an outer surface of said ring member comes into contact with said frame, and said stator and said ring member are cooled when said stator and said ring member thermally expand.

2. The rotary electric machine according to claim 1, wherein said ring member has a supporting portion projecting from the outer surface of said ring member, and said ring member is supported by said frame with said gap created in between as the supporting portion comes into contact with said frame.

3. The rotary electric machine according to claim 2, wherein said supporting portion has a springlike structure which forces said frame radially outward.

4. The rotary electric machine according to claim 3, wherein said supporting portion is a hooking part formed by cutting and bending part of said ring member.

5. The rotary electric machine according to claim 4, wherein said frame has a recess formed in an inner surface thereof for retaining said supporting portion.

6. The rotary electric machine according to claim 2, wherein said ring member is a tolerance ring.

7. The rotary electric machine according to claim 1, wherein said ring member is made of the same material as said stator.

8. The rotary electric machine according to claim 1, wherein said ring member has a thickness not exceeding 2.5% of an outside diameter of said stator.

9. The rotary electric machine according to claim 1, wherein said frame has a fluid passage for circulating a cooling medium.

* * * * *